United States Patent [19]
Shah

[11] Patent Number: 6,129,273
[45] Date of Patent: Oct. 10, 2000

[54] METHOD AND APPARATUS FOR AN AUTOMATED, COMPUTER APPROVED, CHECK CASHING SYSTEM

[76] Inventor: Dinesh V. Shah, 128 Madrona Dr., Eustis, Fla. 32726

[21] Appl. No.: 09/161,582

[22] Filed: Sep. 28, 1998

Related U.S. Application Data

[63] Continuation-in-part of application No. 08/915,903, Aug. 21, 1997, abandoned
[60] Provisional application No. 60/024,268, Aug. 21, 1996.

[51] Int. Cl.⁷ ........................................................ G06K 5/00
[52] U.S. Cl. ............................................. 235/380; 235/375
[58] Field of Search .................................... 235/380, 381, 235/382.5, 375, 379, 492

[56] References Cited

U.S. PATENT DOCUMENTS

| | | | |
|---|---|---|---|
| 5,592,377 | 1/1997 | Lipkin | 395/242 |
| 5,897,625 | 4/1999 | Gustin et al. | 705/43 |
| 5,987,439 | 11/1999 | Gustin et al. | 705/43 |
| 6,012,048 | 1/2000 | Gustin et al. | 705/39 |

*Primary Examiner*—Thien M. Le
*Attorney, Agent, or Firm*—James H. Beusse; Holland & Knight LLP

[57] ABSTRACT

A method and apparatus for automated check cashing in which an approved payee is allowed to cash a bank check payable to the payee by a previously identified maker. The method and apparatus is usable for check cashing systems that are not associated with a particular bank and are of the type in which a computer records specific information about the payee and about checks to be cashed by the payee prior to allowing the payee to use the system. Once the payee has registered with the system and has been approved for cashing checks, the system automatically inspects each check using optical readers and MICR readers to verify the identity of a check and record information written on the check. The system can then compare the information entered by the payee and the information on the check to verify that the check is of the type which has been pre-approved for cashing in the automated system. The system may be programmed to allow the cash due from a check to be applied for services other than being dispensed as cash such as by payment of specified bills, wire transfer or crediting the payee's account for future use. Additionally, the system may be connected through the optical reader to a remote operator to review checks which have illegible writing thereon so that the remote operator can provide approval of the cashing of the check.

10 Claims, 9 Drawing Sheets

| BANK ROUTE NO. | ACCOUNT NO. | MAXIMUM AMOUNT/CHK. | PERIOD OF CASHING | MAXIMUM INACTIVE PERIOD | GROUP | OPTICAL DATA | |
|---|---|---|---|---|---|---|---|
| | | | | | | AMOUNT LOCATION | SIGN'R LOCATION |
| 0679325 | 347928 | $370 | TWO CHKS. PER WEEK | 4 MONTHS | TYPE A OR B CHECKS | | |

METHOD AND APPARATUS FOR AN AUTOMATED, COMPUTER APPROVED, CHECK CASHING SYSTEM

CONTINUING DATA AS CLAIMED BY APPLICANT

This application is a continuation-in-part of U.S. Ser. No. 08/915,903, filed Aug. 21, 1997 now abandoned, which was a continuation of provisional application, U.S. Ser. No. 60/024,268, filed Aug. 21, 1996.

BACKGROUND OF THE INVENTION

The present invention relates to an automated check cashing system and, more specifically, to a method and apparatus for implementing an automated check cashing system in which a computer can approve and cash checks in specific situations for an identified customer presenting pre-qualified checks as specified in the customer's data file.

Operator assisted check cashing or financial exchange business are all around. Basically they take up-front risks by giving cash, call it a loan, to a customer, on a presented check or a negotiable instrument. Each system anticipates that enough legwork has been done so that cashed checks will not come back from banks for non-sufficient funds or account closed or stop payment or forgery or been copied or been laser printed or lost and found or stolen. There are different types of checks, different types of customers, and different backgrounds for each situation that opens a wide array of possibilities before cashing such instruments and as such creates a multitude of procedures for all encountered situations. Approval of cashing of a presented instrument is based upon decisions made from information available by examining, searching, and verifying gathered data in accordance with laid procedures for a given situation.

U.S. Pat. Nos. 5,592,377; 4,580,040; and 4,617,457 disclose check cashing systems, each of which involves human intervention in searching for needed information, verifying and authorizing typical information, examining all gathered information, using judgement on them, and finally approving or disapproving a given type of check for its cashing. U.S. Pat. Nos. 4,249,163; 4,810,866; and Re. 33,688 describe systems which involve cash withdrawal from a customer's own account when there are sufficient funds available to cover the cashing of a presented check.

It would be beneficial to have a check cashing system, not interfaced with a customer's bank account, and that does not require human intervention to cash a check.

SUMMARY OF THE INVENTION

Although no computer system can automate all situations in cashing of a presented check, this invention focuses on an automated computer system for approving and cashing checks in selected situations involving known customers and designated checks from presented by them. The computer system is preprogrammed to check selected requirements and approve or reject the cashing of a specified presented instrument from a known customer.

Many check cashing places do cash different types of negotiable instruments such as checks, money orders, etc., manually. This invention provides the means to cash designated negotiable instruments to an assigned payee through an automated computer approved, check cashing terminal or kiosk, hereinafter designated as an automated check cashing terminal or ACCT. The ACCT of the present invention is also capable of providing other financial services from cash due a customer, such as issuing money orders, specified bill payments, wire transfer to other remote ACCT's, and crediting assigned payee's accounts for future use.

When comparing the present invention to the prior art, this invention is distinctly different in its application, method of cashing, types of checks, and use of remote operators when used alternatively in the following manner:

(1) No bank balance are checked on maker's account;

(2) No funds are withdrawn or transferred from instrument maker's account nor allocated in any way for the payment against an instrument to be cashed;

(3) Only designated checks allocated to an authorized customer can be cashed;

(4) An authorized customer's file has designated check maker's data as well as set conditions and criteria to be used for an approval of the cashing of a designated check at ACCTs;

(5) An ACCT has the means to optically read the designated check and use the desired data from the check for its use in a check cashing approval process. Alternatively when remote operators are used, then their role is only to create a matching code from a designated check, in place of optically reading of the desired data, for its approval process at an ACCT; and (6) An ACCT does not transmit scanned image of a presenter's check to a remote live operator for acceptance.

An ACCT has a computerized terminal with peripheral devices to interact with an assigned payee, receive applicable data through keyboard, accept a magnetic striped patron card, collect a designated negotiable instrument, read the desired data from a designated instrument through a check reader/checker, and a programing means to meet the set requirements as laid out in payee's file for the approval of presented instrument and dispense cash as well as provide services per customer's choice from available cash. The invention specifically focuses on negotiable instrument acceptance method based upon meeting the set requirements laid out in existing assigned payee's file.

An ACCT has the means and programming to collect a negotiable instrument from an assigned payee, read the specified data from collected negotiable instrument with proofing of magnetic ink content on a defined segment of it, collect data from keyboard entry with or without information from patron card's memory, compare with the data from payee's file, and, when all criteria are met approving the negotiable instrument for it's cashing and provide desired services. The payee's file may be resident in the ACCT memory or accessed from the payee's patron card memory or accessed from a specified remote terminal that is part of the check cashing system network. The check reader/checker has a magnetic stripe reader, known in the prior art as a MICR line reader, a device that reads data from the bottom stripe of a negotiable instrument that includes a series of numbers comprising of a check number, bank transit (route) number and maker's account number along with proofing of their magnetic ink. The check reader/checker further includes an optical scanner accompanied with optical character recognition (OCR) software to scan and recognize the data from a presented designated check. The programming instructions thereby bring out specified data from specified locations per assigned payee's file from recognized scanned check image. In this form, the invention focuses on a method of reading specified data, typically amount and presence of signatures from a presented designated check, and use of the data in the check approval process. The assigned payee's file, among other items, includes criteria for authorized negotiable instruments, i.e., bank route number, maker's account number, optical field location for amount and signatures, maximum amount per check, frequency or number of checks to be accepted in a given period, and maximum inactive period. Matching of authorized negotiable instrument data and satisfying the set criteria are the basis for approval of the presented authorized negotiable instrument. Services include, but are not limited to, issuing other negotiable instruments like money orders, payment of offered bills, wire transfers, and means to credit a payee's account.

In an alternate arrangement, an assigned payee first receives a matching code from an allocated human operator for a designated check to be cashed later at an ACCT. A matching code includes, but is not limited to, a check number, amount of check and an identification of an operator responsible for creating an encoded matching code for a presented check. An ACCT has programming means to decode such matching codes, to be keyed in by payee, during check cashing transaction. In such transactions, the matching code does the job similar to a scanner and an optical character recognition system used in the check reader/checker. The check reader/checker uses only the magnetic stripe reader in this arrangement for such transaction. In this method, the invention focuses on creating an encoded matching code by a human operator and later use of this decoded matching code by ACCT in cashing of a presented designated check per set requirements laid out in the payee's file.

An ACCT can retrieve this matching code in several ways. Matching code can be installed in memory media on a patron card by magnetic encoding for a given designated check and later retrieved by an ACCT during a transaction, or given to a payee to be keyed in later at an ACCT during a transaction, or the created matching code along with the payee ID can be electronically transmitted to the applicable ACCT's, or a matching code is imprinted on the corresponding designated check to be read later at an ACCT during a transaction. When a matching code along with a payee's ID is transmitted electronically to a given ACCT, the programming instructions of the main computer are revised to process this matching code for an identified customer for the cashing of a designated check. All these are alternative methods for transferring the matching code data to ACCT in facilitating the cashing of a designated check, and are part of the present invention. Presence of a designated check is important in creating its matching code. It is immaterial whether a designated check is brought in physically, delivered by mail as a copy, or an image of it is electronically transmitted to a responsible human operator for creating a matching code. All these means fall within the scope of this invention.

In a typical process, an assigned payee approaches a nearby ACCT, selects the check cashing service from a menu, provides a personal identification number (PIN) with or without a patron card, inserts an authorized negotiable instrument when prompted, enters keyed data during computer interaction including matching code when applicable. When the item is accepted, an assigned payee is prompted with the choice of cash or other options. The selected choice is then dispensed to the payee. When the ACCT is unable to approve the inserted negotiable instrument, it is returned to the payee.

The payee can be assigned to use an ACCT through any check cashing business authorized to participate in ACCT operation. The specified maker of a negotiable instrument that an assigned payee can cash is referred to as a designated instrument or check. It is the decision of a check cashing business involved with ACCT operation, to decide whether a customer can be an assigned payee with the selected checks to be the designated checks for later cashing at an ACCT, depending upon the customer's background information, qualification of the maker's designated checks and frequency of getting such designated checks in future. The assignment of a payee includes the data for the designated checks, specifying the governing criteria for their cashing, allocating PIN, all laid out in customer's file. Depending upon a customer's check cashing location at different times, a customer's file can be resident in a given ACCT, in a given region's database that is networked with ACCTs in that region, or in patron card's memory media. When payee's file is stored in a patron card's memory media, the payee has the flexibility to use it at any ACCT. That makes such patron card with payee's file to be a universal patron card. When payee's file is resident in a given region's remote database, payee could use any ACCT in that region for intended check cashing. The selected ACCT, knowing the payee's account number or PIN number, would retrieve payee's file from the region's remote database and proceed as usual. Depending upon the type of check, the maker of a check, customer's background, and customer's credit status, a payee's file is laid out in two groups. The first group has in a payee's file, among other criteria, the optical locations for an amount, maker's signature and customer's signature and does not need a matching code from live operator for cashing of a designated instrument. In the second group, a payee's file does not include optical locations for amount and signatures but ought to have a matching code for the cashing of designated checks.

In the first group, group A, a payee's file does include bank route number, account number, maximum amount that can be cashed per check, number of checks that can be cashed in a given period, maximum period, within which a second designated check has to be cashed for further check cashing, optical field locations for amount and signatures. The check reader/checker does include magnetic stripe reader as well as scanner with OCR system. Programming instructions for check cashing involves matching of bank route number and account number, inspection for magnetic ink in the designated check's bottom stripe, inspection for the presence of maker's and customer's signatures, evaluating the time difference between last check and today to check the number of checks per specified period, maximum inactive period is satisfied, and checking that the amount of the check as read from the check does not exceed the maximum amount allowed.

In the second group, group B, a payee's file does include all as group A, except it does not have an optical field location for amount and signatures. The check reader/checker's scanner and OCR system is inactive. Cashing of a designated check of the group B type requires that the payee first obtain a matching code from a person authorized to issue such codes. The matching code is used to confirm the amount of the check for a specific check number and may be created using an algorithm which combines the check amount, the check number and a code number which identifies the person issueing the matching code. Programming instructions at the ACCT decode the issued matching code to read the check number, amount and authorized operator number. Programming instructions for designated check cashing involves matching of the check number as read with a decoded matching code, matching of bank route and account numbers, evaluating time difference between now and previous check for satisfying number of checks in a specified period and maximum inactive period, and checking that the decoded amount does not exceed the specified maximum amount. A privileged customer may have one or more criteria left open in payee's file, like a wild card, where any collected data for that field is acceptable, for example, not including a bank number and account number, would still fall within this invention.

BRIEF DESCRIPTION OF DRAWINGS

For a better understanding of the present invention, reference the following detailed description taken in conjunction with the accompanying drawings in which.

DETAILED DESCRIPTION OF THE INVENTION

Figure 1:
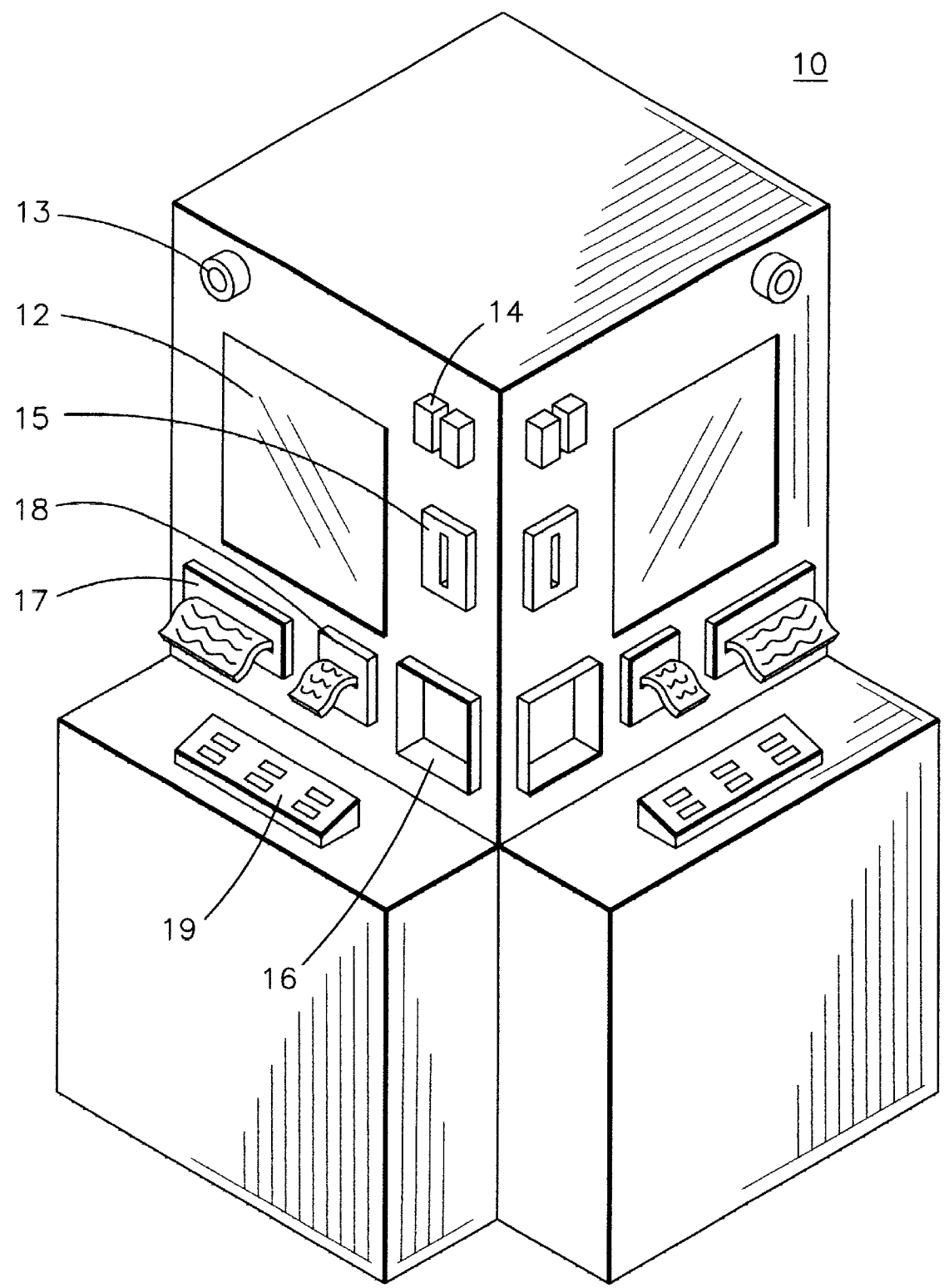
FIG. 1 is perspective drawing of an automated check-cashing terminal (ACCT) of a check-cashing machine with two work stations.

FIG. 1 is perspective drawing of two work stations of an automated check-cashing terminal (ACCT) 11. The ACCT 11 of FIG. 1 includes at least two work stations and may include at least two others on the non-visible sides of the ACCT. Each ACCT work station includes a video monitor 12. All instructions that a payee needs to follow are displayed on the video monitor 12. Positioned above the video monitor 12 in a position to best view a payee, is a camera 13. For security concerns, the camera 13 is programmed to take pictures of a payee during a transaction. The embodiment of FIG. 1 also includes a check-cashing card (patron card) slot 14, a check insertion slot 15, a cash dispensing slot 16, a negotiable instrument dispensing slot 17, a receipt retrieval slot 18, and a keyboard 19. The keyboard 19 is the primary device through which a payee will interact with the check-cashing system.

Figure 2:
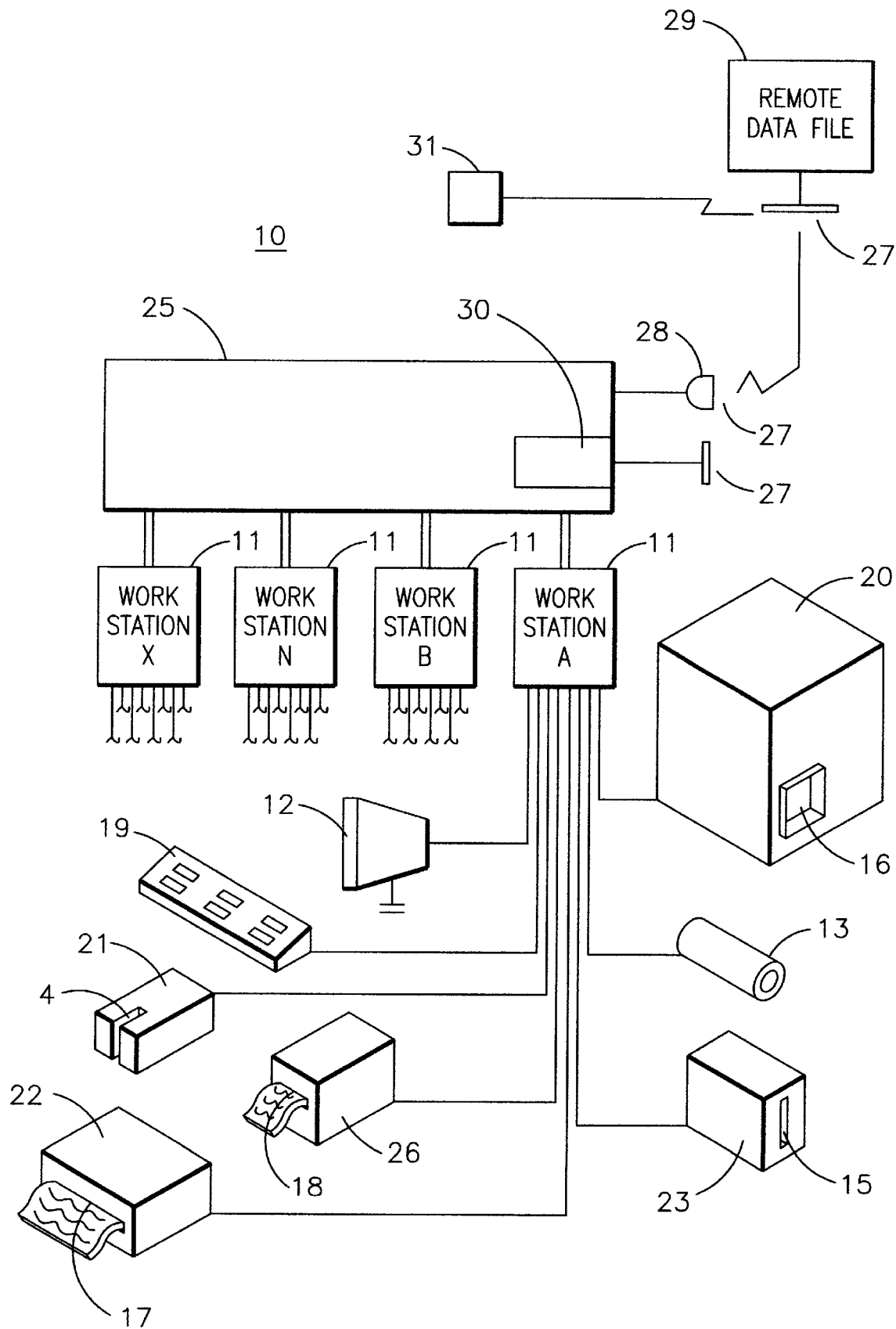
FIG. 2 is a drawing of the components associated with each work station of the ACCT of FIG. 1.

FIG. 2 illustrates in more detail the components of each work station of the ACCT 11. Each ACCT 11 includes a computer 25 which interfaces to each work station. The computer 25 is connected to each keyboard 19 where a payee enters information for the transaction as prompted by the computer 25 through video monitor 12 where the computer commands are viewed. The computer 25 also interfaces with the magnetic card reader 21 and its check-cashing card slot 14, receipt printer 26 and its slot for dispensing a receipt 18, negotiable instrument printer 22 and its slot for dispensing a negotiable instrument 17, cash storage unit/dispenser 20 and a slot for dispensing cash 16, a camera 13, and check reader 23 and its slot for receiving a check 15. A single power cord 28 supplies power for the ACCT 11. A phone line 27 is preferably coupled to the ACCT 11 to allow downloading of data and receipt of data relating to customer files. All remote transfers and receptions are conducted though an internal modem 30.

Figures 3, 4:
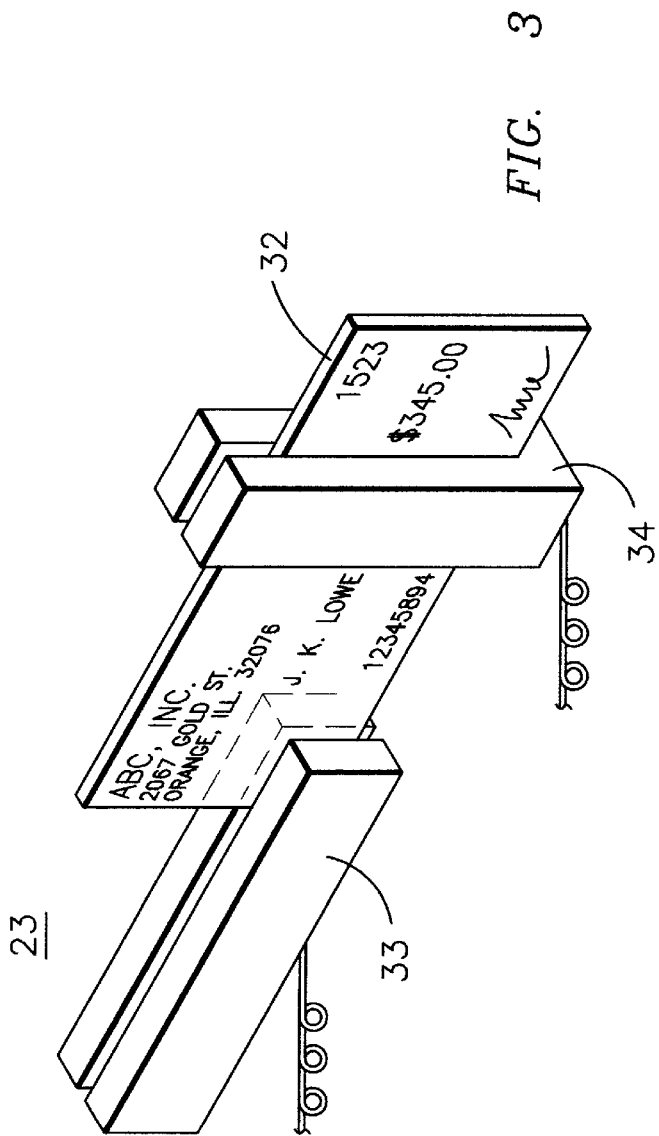
FIG. 3 is perspective view of an internal check reader.
FIG. 4 is an example of the type of information stored in a database specific for each payee.

FIG. 3 is a perspective view of a check reader 23. In the embodiment of FIG. 3, a check 32 is read by a magnetic stripe reader 33 and an optical scanner 34. Optical character reader (OCR) software is used with scanner 34. The magnetic stripe reader 33 reads a bank's routing number, a customer account number, and a check number. Known as the MICR line, these numbers are printed in magnetic ink at the bottom of a check. Using a magnetic stripe reader 33 to read a MICR line is known in the prior art. The present invention combines the magnetic stripe reader 33 with the scanner 34 to provide both a magnetic and optical reading of the check. The type of data that may be collected includes the amount of the check, and verification that a signature appears on the front and back of a check. At a minimum, when OCR technology improves, it may also verify that all signatures on the check are authentic. Use of a new device which combines magnetic strip reader/checker 33 and a scanner with OCR system 34 is a matter of time and improvement over existing devices and related software and that would still fall under this invention. When a matching code is imprinted on a designated check, programming instructions in the computer 25 enable recognition of the code and its capture from the scanner 34 using conventional OCR technology by making it active in the process of cashing of a designated check with imprinted matching code.

FIG. 4 illustrated one form of database entry in a payee's file. In different embodiments of this invention, a payee's file can reside in a check-cashing machine's computer 25, or in a check-cashing or patron card, which is equipped with a memory media. The information in a payee's file can include, but is not limited to, the bank's routing number 35; maker's bank account number 36; maximum amount that may appear on the check 37; a minimum inactive period between transactions 38; a maximum inactive period between transactions 39; whether the check is a group A or group B check; a location on the check where the amount of the check will appear 41; and a location on the checks where a front and back signature will appear 42. From the data file's perspective, the primary difference between group A and group B checks are that the optical scanner fields 41, 42 are not used for group B checks. The system program may be designed where if no information is given for a specific field, then no limitations relating to that field will apply. Once this information is entered by a human operator, a check holder who wishes to cash subsequent checks drawn from the same bank account on a regular basis will not require human operator verification again. In another embodiment of the present invention, instead of including a file entry for the check amount's location, the OCR scanner will simply scan the check for an appropriate character string identifier such as the $ symbol and then read the amount after this character string. It will be recognized that the information described above is stored in memory in the computer 25 or magnetically encoded in the payee's assigned universal patron card's memory media.

Figure 5:
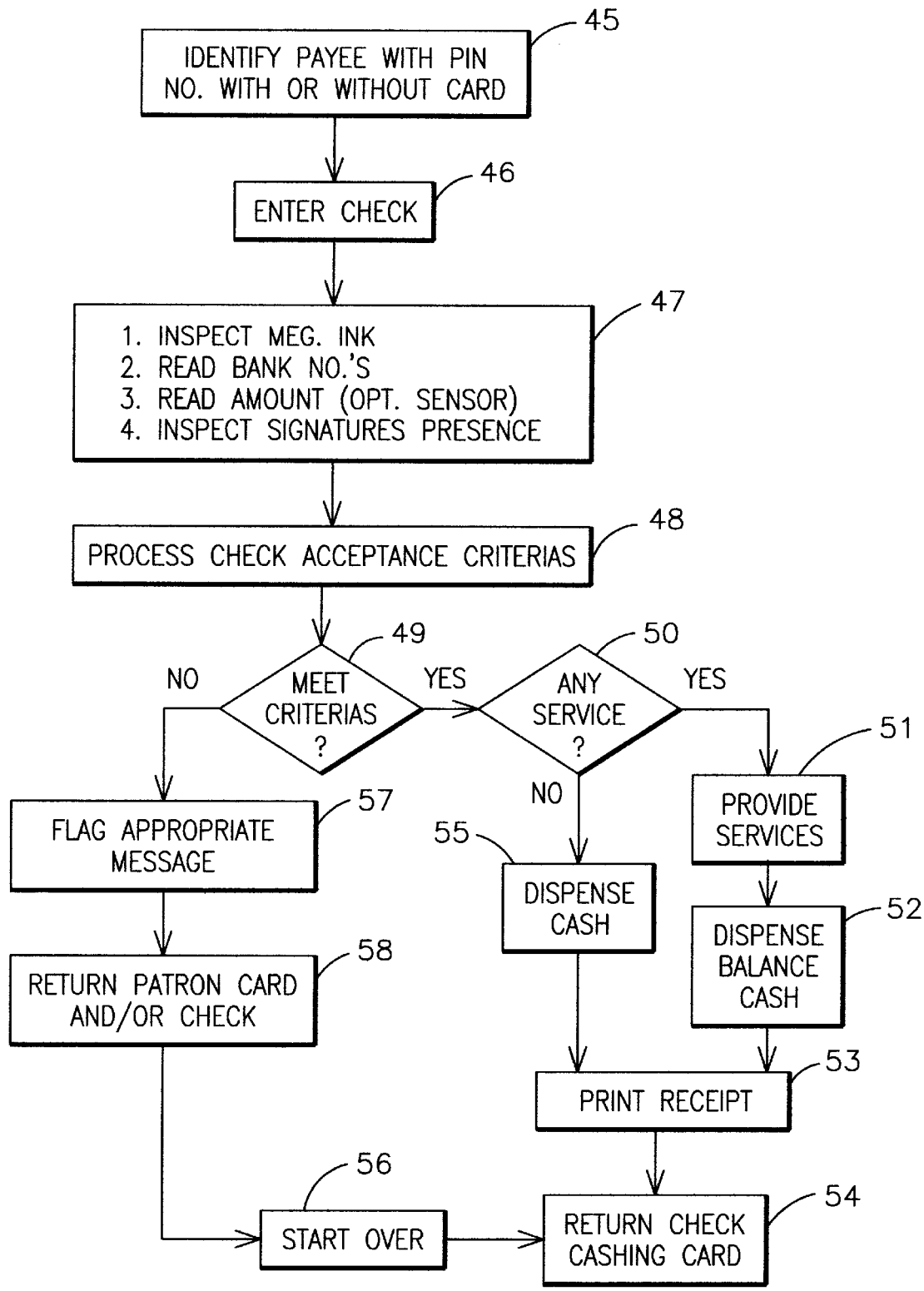
FIG. 5 is a flow chart depicting the process for cashing a check where a payee of the check and its maker are previously approved.

FIG. 5 is a flow chart depicting one embodiment of a process for cashing a check where a check's holder and check's maker are previously approved. In the embodiment of FIG. 5, to initiate use of a check-cashing terminal, a payee enters either a personal identification number (PIN) by way of the keyboard 19, with or without inserting an identification card into the slot, box 45. The payee will then enter a check in the check slot, box 46. Once the check is inside the check-cashing terminal or ACCT, box 47, the check reader inspects the check to insure that magnetic ink is present on the MICR line and reads the MICR line to verify the correct bank account numbers. The OCR scanner 34 will then identify the amount of the check and inspect for the presence of signatures on the front and back, box 47. The ACCT computer 25 will then access the payee's database file (FIG. 4) and verify that the check meets the check acceptance criteria, box 48. If the check passes the criteria, decision box 49, the check-cashing terminal's computer will ask the payee what service is desired, decision box 50. The possible services may include drafting a new negotiable instrument (e.g., cashiers check or money order), wiring money, or depositing funds into a bill account (e.g., phone or utility bill). As embodied in box 51, if a service other than cash is required, the check-cashing terminal will provide the service. If the service requested does not require the full check amount, the remaining cash will be dispensed to the check holder, box 52. In the next step, box 53, the check-cashing terminal will print a receipt, return the payee's check-cashing card, box 54, and then reset itself, box 56, for the next payee. If only cashing service is requested, decision box 50, the terminal will just dispense cash, box 55, print a receipt, box 53, for the transaction, return the payee's check-cashing card, box 53, and then reset itself, box 56, for the next payee. If the check does not meet the criteria in the payee's database file or has some other defect, decision box 49, a message will be relayed to the payee, box 57, and the check-cashing card and/or check will be returned, box 58. The check-cashing terminal will then reset itself, box 56.

Figure 6:
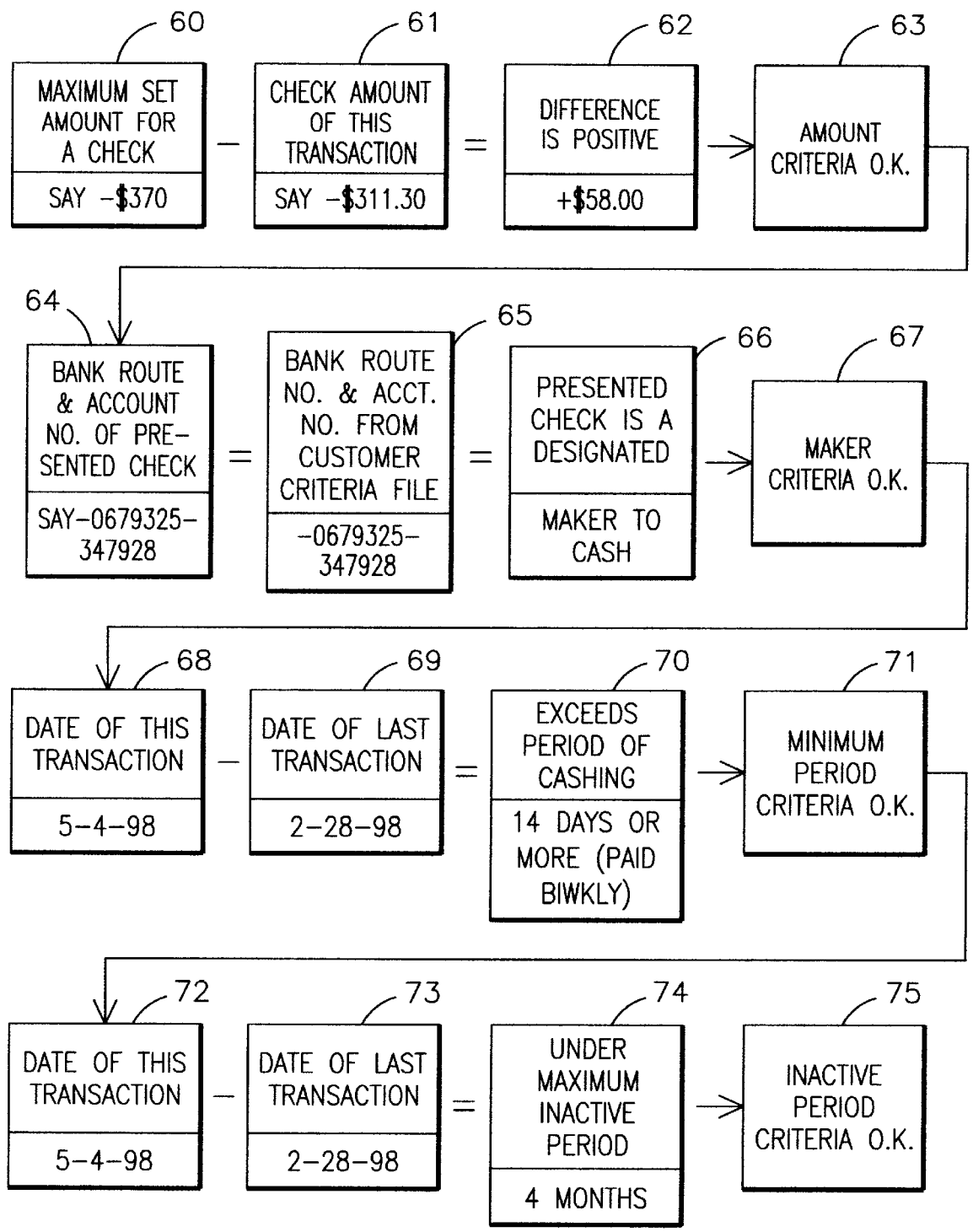
FIG. 6 is an expanded view of computerized decisions implemented in the "process check acceptance criteria" step identified in FIG. 5.

FIG. 6 is an expanded view of the computerized decisions implemented in the "process check acceptance criteria," box 58, embodied in FIG. 5 and based on the data file embodied in FIG. 4. Though not the only embodiment of these procedures, for the first criteria, the computer will compute the difference between the maximum check-cashing amount, box 60, and the amount of a check presented for cashing, box 61. If the difference is a positive number or zero, box 62, the computer will accept this check for now, box 63, and attempt to verify the next criteria.

For the second criteria, the computer will match the bank route number and account number preprogrammed, box 64, to the numbers in the MICR line on the check, box 65. If they match, the computer will recognize this check as one designated for cashing, box 66. The computer will accept the check for now, box 67, and will attempt to verify the next criteria.

Using the OCR scanner 34 to obtain the information, the computer will determine the difference between the date of the present transaction, box 68, and the last transaction, box 69. If the number of days between the two transactions exceeds the minimum number of days preprogrammed as an acceptable period between transactions, box 70, the computer accepts the check for now, box 71, and will attempt to verify the next criteria. The computer will once again compute the difference between the date of the present transaction, box 72, and the last transaction, box 73. If the number of days between the present and last transactions is within the maximum number of days or inactivity preprogrammed, box 74, the computer will accept the check as meeting this criteria, box 75.

Figures 7, 9, 10:
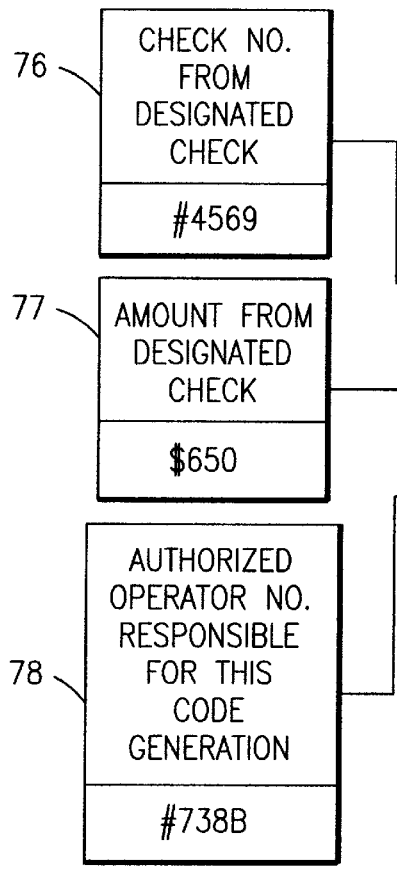
FIG. 7 is a flowchart illustrating steps used to generate a matching code.
FIGS. 9 and 10 illustrate alternate embodiments of data composition for a patron card.

FIG. 7 is a flowchart illustrating one embodiment of steps used to generate a matching code. The check-cashing system uses a matching code method for checks that are classified as Type B. Though not the only embodiment of generating a matching code, in the embodiment of FIG. 7, a human operator will collect the check number, box 76, the check's amount, box 77, and his/her operator number, box 78. A pre-programmed formula, box 79, is then used to generate a matching code, box 80. How the check-cashing system receives the matching code when a payee enters a check are varied. For example, in one embodiment of the invention, this code is printed on the check in either numeric representation or some other form. In another embodiment, the code is printed on a receipt for the check holder to use at a check-cashing terminal. As a third embodiment, the matching code is programmed into a payee's check-cashing card's memory media. Further, the matching code could be transmitted electronically to a designated ACCT.

Figure 8:
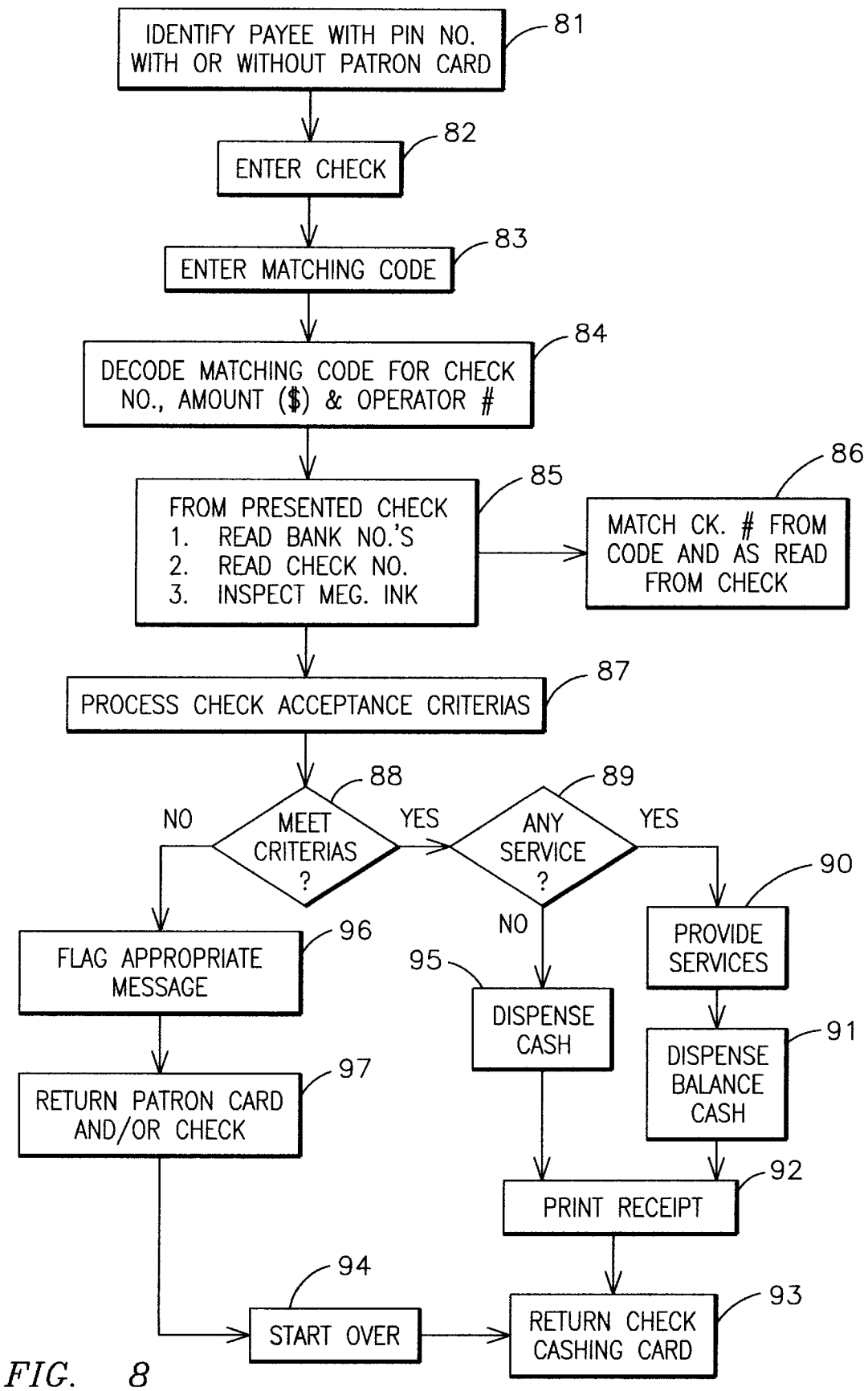
FIG. 8 is a flowchart depicting the process involved in cashing a check, which has a matching code.

FIG. 8 is a flowchart depicting the process involved in cashing a check, which has a matching code. In the embodiment of FIG. 8, a payee will enter a previously assigned PIN, with or without an identification card, box 81. The payee will then enter a check in the check slot, box 82. The payee will then enter the matching code, box 83. The check-cashing system will then decode the matching code, box 84. The check reader will then read the MICR line to verify magnetic ink is used, the bank routing number and check number, box 85. The check-cashing system will then compare the MICR line information to the decoded matching code, box 86 and then review the check to insure it meets the check acceptance criteria, box 87.

If the check passes the criteria, decision box 88, the check-cashing terminal's computer will ask the payee if any service (other than mere cashing of the check) is desired, decision box 89. If a service is required, the check-cashing terminal will provide the service, box 90. In box 91, if the service requested does not require the full check amount, the remaining cash will be dispensed to the check holder. Next, the check-cashing terminal 11 will print a receipt, box 92, return the payee's check-cashing card, box 93, and then reset itself, box 94, for the next payee. If no service is requested, decision box 89, the terminal will just dispense cash, box 95, print a receipt, box 92, for the transaction, return the payee's check-cashing card, box 93, and then reset itself, box 94, for the next payee. If the check does not meet the criteria, decision box 88, a message will be relayed to the payee, box 96, and the check and/or check-cashing card will be returned, box 97. The check-cashing terminal will then reset itself, box 94.

Referring now to FIGS. 9 and 10, there is shown two alternate embodiments of information which may be incorporated into a patron card or payee's card by magnetically encoding the information into a magnetic stripe on the card as is commonly done with ID or credit cards. Alternately, the card may include a computer chip rather than a magnetic stripe for storage of the information. In the first type of card shown in FIG. 9, the only information required is the payee name, PIN number, account number and the maximum credit amount but such card is restricted to a designated ACCT having payee's data. In the secondary or universal card, FIG. 10, which may be used in multiple ACCT's, the information may include such things as the maker's name, the bank route number, maker account number, maximum dollar limits, minimum and maximum periods for cashing a check and optical locations on the check at which the various items of information are located. Such a card preferably includes means for storing data relating to past transactions and such data may be updated in the card when the card is used in the ACCT for a given transaction through the card reader/writer 21.

In both types of patron cards, the card reader/writer 21 updates the credit amount when payee elects to transfer cash due to the credit balance on the card or elects to receive cash from the credit available on the card.

Reference was previously made to a type A and a type B check, the type A check being a check which is preferably computer generated and for which acceptance can be made at an ACCT without further human intervention. The handling of the computer generated checks normally requires only that a human operator create a new ACCT account indicated at block 100 in FIG. 11. Once the operator has created the account with all the appropriate information as discussed above, that data can then be transmitted to a selected ACCT to allow the account owner to then cash checks at that terminal. As indicated in block 102, if the payee has a check which meets all of the criteria stored in his account, he may then proceed directly to the ACCT terminal to obtain cashing of all submitted checks having the same account or maker. However, if the payee receives a check from a new maker, block 104, it may require that the payee return to the human operator to receive approval of the check issued by the new maker.

Figure 12:
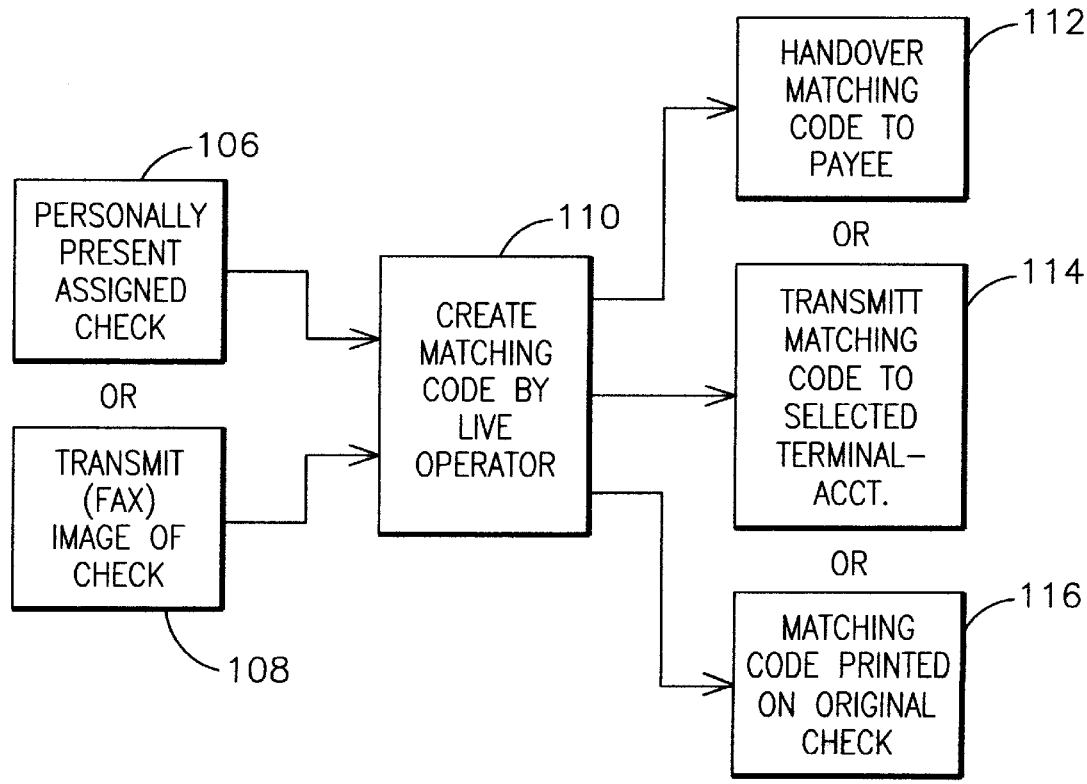
FIG. 12 is a flow chart illustrating alternative processes for obtaining a matching code and transmission of the matching code to a designated ACCT.

For the type B checks which cannot be recognized by a scanner with OCR 34, the process of automatic check cashing further requires at least an operator to read the check amount and check number and to provide to the ACCT a matching code indicating the dollar amount of the check in a coded combination with the check number as previously described. As shown in FIG. 12, if the check is a type B check, the payee must personally present the assigned check, block 106, or deliver an image of the check, block 108, to the human operator, block 110. The human operator then creates a code which is a combination of the dollar amount of the check and the check number and either gives that matching code to the payee, block 112, transmits the matching code to the selected ACCT terminal, block 114, or prints the matching code on the check, block 116 or encoded on the patron cards memory media, block 118. Once the matching code has been made available, the payee may then proceed to the ACCT terminal and process the check in the manner as previously described.

It will be appreciated that what has been described as a system which eliminates much of the human interface required in past efforts of trying to process checks from individuals without verifying that the maker of the check has sufficient funds to assure that the check will not bounce or that the payee of the check has sufficient funds in its account to assure that the bank or other check casher will not be injured if the check does not clear. It also does not require verifying that the maker is a qualified business, that the payee has legitimate identification, that the address provided by payee is valid, that the payee or maker doe snot have a history of bad checks. In the present system, sufficient information is gathered up front to assure that there is little likelihood that the check will not be approved when presented to the bank. In general, the system relies on an assumption that a person (the payee) will be employed by a specific employer who will be the check maker, and that the the payee will receive checks at regular intervals and that the received checks will generally be for about the same amount. For some situations, identified as the group B category, the payee will receive checks from different makers but those checks will generally be within a known dollar range and the payee is likely to be reliable. The present invention is therefore adapted for recognizing these general characteristics to enable cashing of checks without human approval of each check.

Figure 11:
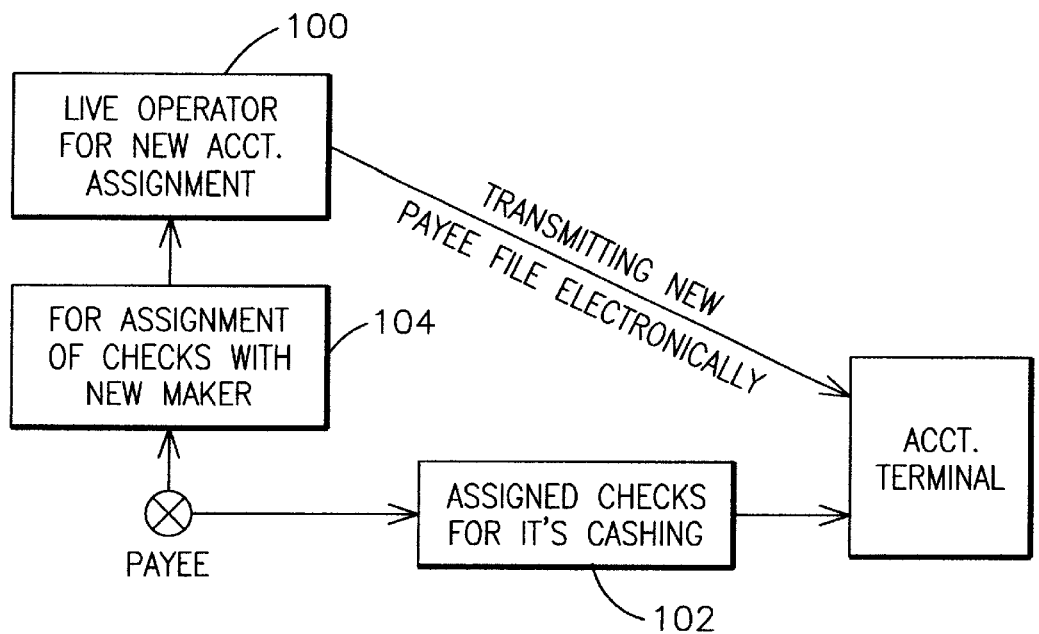
FIG. 11 is a simplified flow chart of the process for setting up a customer account and subsequent use of the account for check cashing.
Figure 13:
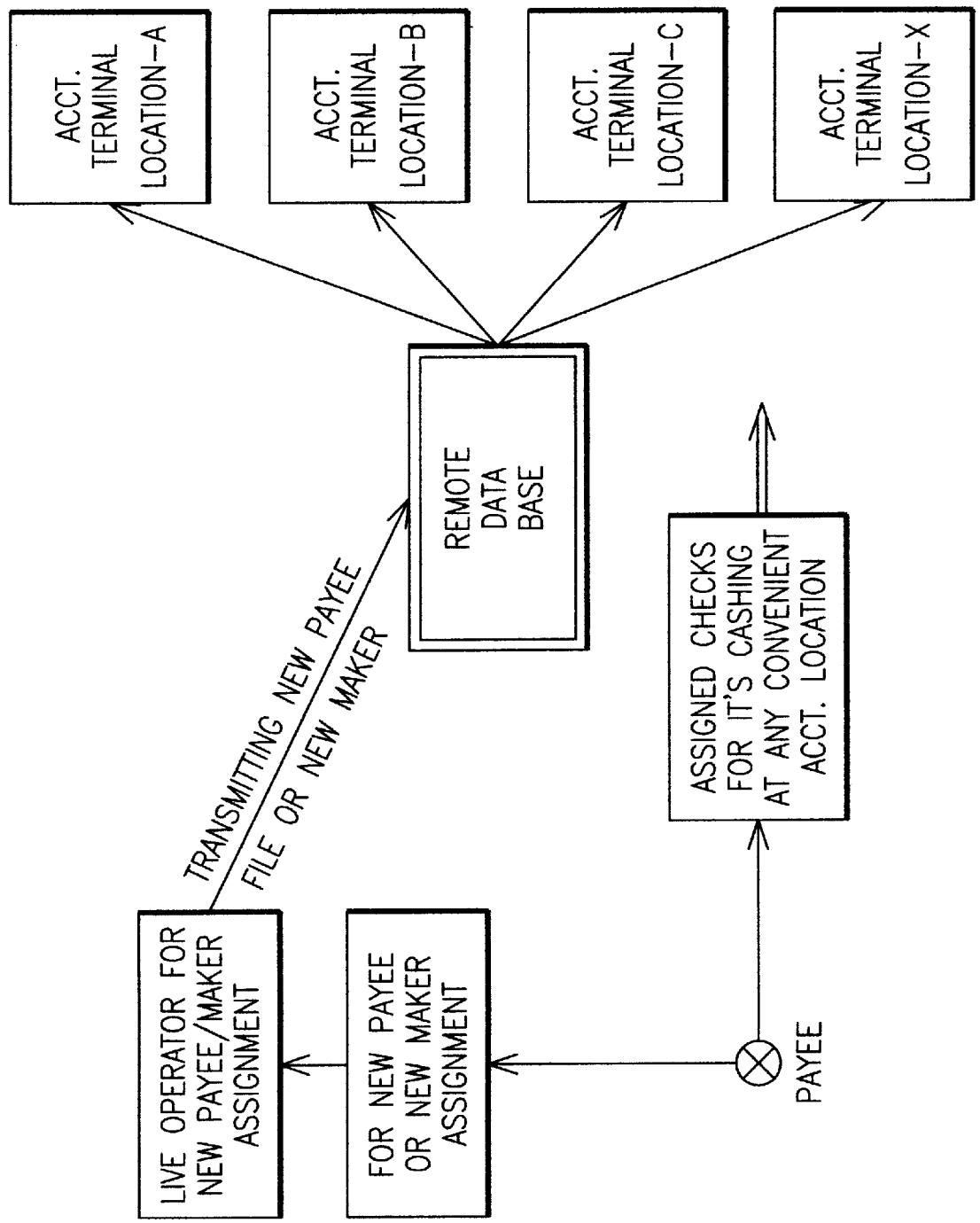
FIG. 13 is an overview process of a check cashing system where payee has flexibility to use any terminal.

The embodiment of the check cashing system as discussed in FIG. 11 restricts a payee to cash a designated check at a pre-assigned ACCT. An alternative embodiment of a check cashing system as shown in FIG. 13 provides a flexibility to a payee to cash a designated check to any account in a given system. In such system, a new payee file or maker update in a file is done at a remote database instead of at given ACCT.

While the invention has been described in what is presently considered to be a preferred embodiment, many variations and modifications will become apparent to those skilled in the art. Accordingly, the invention should not be limited to the specific illustrative embodiment, but be interpreted within the full spirit and scope of the appended claims.

What is claimed is:

1. A method of cashing checks through an automated check-cashing terminal (ACCT) in which no human operator interface is needed, after an initial setup, when successive checks are drawn against the same maker's checking account by the same payee, the method comprising the steps of:
   (a) prior to a first use of the ACCT:
      setting up, in a designated ACCT, account information, by a human operator, about a payee and a payee's checks and assigning the payee a means of personal identification;
   (b) for check cashing after initial setup;
      using the personal identification means to access the designated ACCT;
      placing a check to be cashed into a check receptacle in the ACCT; and
   (c) wherein the ACCT performs the steps of:
      reading selected data on the check and comparing the selected data to information stored in the payee's account in the terminal;
      verifying that the selected data meets all payee criteria for cashing checks; and
      dispensing cash or providing another service as requested by the payee.

2. The method of claim 1 wherein the step of setting up a payee account includes the steps of entering a check's bank routing number, maker's account number, maximum dollar amount that the system will accept from this account, minimum and maximum amount of time between cashing of successive checks, location of the dollar amount on the check, location of the signatures on the front and back of the check, and whether a matching code is required.

3. The method of claim 2 wherein information collected is stored in an electronic data file and accessed based upon an assigned personal identification code.

4. The method of claim 2 wherein information collected is stored in an electronic data file and accessed by use of an identification code stored in electronic media on a check cashing card.

5. The method of claim 1 wherein the steps of reading and verifying information on the check includes:
   magnetically reading a MICR line on the check to verify the correct bank routing number and maker's account number;

reading the amount of the check with an optical character reader; and verifying signatures are properly placed on the front and back of the check.

6. The method of claim 1 wherein the step of providing another service as requested by the payee includes selected at least one optional step from the group comprising the steps of:

drafting another negotiable instrument for the amount of the check;

drafting another negotiable instrument for a lessor amount and then returning the difference as cash;

transferring the money to another location by means of an electronic transfer;

applying the check towards a utility payment, if interfaced with the check-cashing system; and applying part of the check towards a utility payment and then returning the difference as cash.

7. A method of cashing checks in an automated check-cashing terminal (ACCT) where a check is not routinely cashed from the same account, the method comprising the steps of:

(a) prior to a first use of the ACCT:

setting up, in a designated ACCT, account information, by a human operator, about a payee and a payee's checks and assigning the payee a means of personal identification;

(b) presenting a check to be cashed to an operator who can create a matching code based upon the check amount, the check number and an operator identifier;

(c) after receiving matching code:

placing a check into a receptacle in a designated ACCT;

entering the payee identity and the matching code into the ACCT; and (d) wherein the ACCT performs the steps of:

decoding the matching code and verifying that the check matches the matching code; and cashing the check or providing another service as requested by the payee.

8. The method of claim 7 wherein the matching code is provided by at least one of the steps of:

printing on the check;

printing on a separate receipt provided to a payee; and programming into a check-cashing card.

9. The method of claim 7 wherein the step of providing another service as requested by the payee includes selected at least one optional step from the group comprising the steps of:

drafting another negotiable instrument for the amount of the check;

drafting another negotiable instrument for a lessor amount and then returning the difference as cash;

transferring the money to another location by means of an electronic transfer;

applying the check towards a utility payment, if interfaced with the check-cashing system; and applying part of the check towards a utility payment and then returning the difference as cash.

10. An automated check cashing terminal comprising:

a computer, including electronic memory means for storing data, a keyboard for entering data and a display screen for displaying data;

a receptacle for receiving a check to be cashed;

an optical reader and a magnetic reader operatively coupled to said receptacle for reading data on the check;

a dispenser for dispensing cash in exchange for the check; and a computer program operable in said computer for comparing data read on the check to data stored in the memory means and for permitting dispensing of cash when said check data matches said stored data.

* * * * *